United States Patent Office 3,255,223
Patented June 7, 1966

3,255,223
METHOD OF PREPARING STABLE SILVER-CONTAINING COMPOSITIONS
Henry Groh, Barrie, Ontario, Canada, assignor to Yardney International Corp., New York, N.Y., a corporation of New York
No Drawing. Filed Oct. 29, 1962, Ser. No. 233,884
6 Claims. (Cl. 260—414)

This invention relates to a method of making stable antimicrobial compositions of matter and to products resulting therefrom. It relates more particularly to stable solutions or suspensions of material made by the reaction of fatty acids (especially higher fatty acids) with metal oxides (e.g. silver oxide, $Ag_2O$).

It has been suggested that good antimicrobial materials may be made by the reaction of higher fatty acids with silver oxide. In various applications of these products, however, it is necessary to prepare aqueous solutions, i.e. water-containing solutions of the same which are to be used as such or are to be used as stock solutions in the further preparations of other compositions.

Difficulty has been encountered in the preparation of stable aqueous solutions of this character. It has been suggested that the above mentioned reaction products may be solubilized in water by the inclusion of an amine in the solution. Although this procedure makes it possible to dissolve said reaction product in water, the stability of the resulting solution leaves something to be desired. Thus, on standing, the solutions become dark. This even occurs when the solutions were stored in amber bottles.

It is an object of the present invention to provide a method for making stable aqueous solutions of the reaction products of fatty acids and metal oxides, e.g. silver oxides.

It is a further object of the present invention to provide the product resulting from this process.

Other and more detailed objects will be apparent from the following description and claims.

It has now been found that stable aqueous solutions of the reaction products of metal oxides, e.g. silver oxides and fatty acids may be prepared by dissolving said reaction products in an aqueous solution of ammonia, allowing said solution to age whereby a precipitate is formed, and then separating the precipitate from the solution. As used herein, the term aqueous solution includes those solutions wherein water is the only solvent as well as the cases wherein water is only one component of the solvent system.

Although applicant does not want to be bound by any theory of the operation of his invention, it is believed that the instability of aqueous solutions solubilized with amines is due to the fact that the factor responsible for the instability is soluble in aqueous solutions containing the amines. This factor, however, is not very soluble in the aqueous ammonia solutions and consequently it separates from solution on aging.

The concentration of the ammonia in the aqueous solutions in which the above mentioned reaction product is dissolved may vary considerably. This may range from a 5% solution to a 29.5% solution.

The amount of said reaction product which will be contained in such a solution may also extend over a wide range. Suitable solutions contain from .1% to 2% of said product.

Although applicant again does not wish to be bound by any theory, it appears the structure of the fatty acid-metal oxide reaction product employed in this invention are complexes which may be described by the general formula:

(1) 

wherein R is an aliphatic hydrocarbon radical, Me is a heavy metal, x is the valence of the metal, y and z are whole numbers from 1 to 10 and y is greater than z. Me is preferably a heavy metal having antimicrobial or oligodynamic properties. Among these the following may be mentioned by way of illustration: silver, gold, copper, mercury, zinc. Optimum properties have been observed with compounds of Formula 1 wherein Me is silver.

In the preferred form of this invention, the complexes employed are silver salt (argentic or argentous) complexes of higher fatty acid (saturated or unsaturated) containing from 5 to 30 carbon atoms in the chain and particularly 5 to 18 carbon atoms in the chain. These may be described by the general formula:

(2) 

wherein R is the moiety of a fatty acid having from 5 to 30 carbon atoms, (preferably 5 to 18 carbon atoms); x is 1 or 2, y is an integer from 2 to 6. By way of illustration, the fatty acid and acid moiety of Formulas 1 and 2 may be derived from the following acids: valeric, hexanoic, heptylic, caprylic, pelargonic, capric, undecylenic, palmitic, oleic, linoleic, linolinic, stearic, nondecyclic, carnaubic, mellissic, etc.

In preparing the reaction product utilized in this invention, the metal oxide is mixed with the appropriate acid at room temperature. Where the acid is a solid at ordinary temperatures, it is advantageous to melt the acid before reacting it with the metal oxide. The reaction is exothermic and the complexes are produced rapidly.

The relative molar proportions of the reactant employed in preparing the complex vary depending upon the product desired. Products with particularly good antimicrobial properties are prepared by employing the acid and oxide in the ratio of 1 equivalent of acid to 1 equivalent of oxide.

The complexes utilized in the present invention are clearly and unmistakingly different from the corresponding simple salts of the prior art. The differences are manifested by the respective physical properties (e.g. melting points, ionization constants), chemical analysis, and, bactericidal or bacteriostatic properties discussed in more detail below.

The following examples are further illustrative of the present invention. It is to be understood, however, that the invention is not limited thereto.

Examples 1 to 5 are directed to the preparation of typical reaction products which can be utilized in the present invention.

EXAMPLE 1

Take:

| | Grams |
|---|---|
| Caproic acid | 116.2 |
| Silver oxide | 115.9 | and mix them in a mortar until a uniform tan colored powder is obtained. There is a large evolution of heat during the reaction. The product has a melting range of from 249° C. to 254° C., and ionization constant $10^{-2}$. When incorporated in an amount of 1% into a hydrophilic ointment, it gave 4 mm. zone of inhibition against *Staphylococcus aureus* and a 4 mm. zone of inhibition against *Escherichia coli* on a streaked agar plate. The product was purified by boiling it in water and filtering. The analysis of the purified product showed a stoichiometric ratio of 4 silver atoms to 5 acid molecules.

EXAMPLE 2

Take:

| | Grams |
|---|---|
| Caprylic acid | 144 |
| Silver oxide | 116 | and grind them in a mortar until a uniform tan colored powder is obtained. There is some evolution of heat during the reaction. The product obtained has a melting point of 216 to 223° C. and an ionization constant of $10^{-3}$. When incorporated in an amount of 1% into a hydrophilic ointment, it gave a 6 mm. inhibition zone against *Staphylococcus aureus* and a 7 mm. inhibition zone against *Escherichia coli* when plated out on streaked agar plate. The product was purified by boiling it in excess of water to remove any unreacted caprylic acid and silver oxide. The analysis of the purified product showed a stochiometric ratio of 5 silver atoms to 6 molecules of acid.

In Table I below, a comparison is given between the properties of the complexes utilized in the present invention and the corresponding simple silver salts. The simple silver salts were prepared by reacting the sodium salt of the appropriate acid with silver nitrate. "Log K" is the log of the ionization constant of the various materials.

Table I

| Substance | M.P., °C. | Log K | Zone of inhibition | | Stoich. ratio, Ag/Acid |
|---|---|---|---|---|---|
| | | | Staph. a. | E. coli | |
| Product of Example 1 | 249–254 | −2.05 | 4 | 4 | 1:1.25 |
| Silver caproate | 155–156 | −1.65 | 1 | 1 | 1:1 |
| Product of Example 2 | 216–223 | −2.97 | 6 | 7 | 1:1.20 |
| Silver caprylate | 210 | −2.48 | 1 | 1 | 1:1 |

EXAMPLE 3

|  | Grams |
|---|---|
| Hexanoic acid | 100 |
| and | |
| Silver oxide | 100 | are mixed together. Heat immediately evolves, and a straw colored waxy solid is produced. After washing with distilled water and drying, a product is obtained which has a very strong bactericidal effect. It gives zones of inhibition on agar plate inoculated with *Staphylococcus aureus* and *Escherichia coli* even in very low concentrations when diluted with water. The following table illustrates the results:

Table II

| Concentration of Complex | Zone of Inhibition, mm. |
|---|---|
| $10^{-2}$ | 6 |
| $10^{-3}$ | 6 |
| $10^{-4}$ | 5 |
| $10^{-5}$ | 4 |
| $10^{-6}$ | 2 |
| $10^{-7}$ | 2 |
| $10^{-8}$ | 1 |
| Control | —0 |

The product also shows a high fungicidal action when tested against *Aspergillus niger* and *Chaetomium globosum* and *Penicillium gypseum*.

EXAMPLE 4

|  | Grams |
|---|---|
| Undecylenic acid | 100 |
| and | |
| Silver oxide | 10 | are heated gently to 100° C. whereupon a light brown colored liquid is formed which solidified upon cooling to a light brown paste. When placed directly on an inoculated agar plate, a very large inhibition zone against *Escherichia coli* is obtained. When dissolved in methylene chloride at .1% concentration, an 8 mm. zone of inhibition is obtained.

This product is effective against athlete's foot.

EXAMPLE 5

|  | Grams |
|---|---|
| Stearic acid | 100 |
| and | |
| Silver oxide | 10 | are melted whereupon the silver oxide dissolves and gives a brown liquid which solidifies to a brown hard brittle solid upon cooling. When placed directly on an inoculated agar plate, it gives a very large zone of inhibition against *Escherichia coli*. When dissolved in methylene chloride to .1% concentration, an 8 mm. inhibition zone is obtained.

The product is suitable as a bactericidal additive to soap.

EXAMPLE 6

Twenty-five grams of the reaction product of caprylic acid and silver oxide prepared in accordance with the process of Example 2 was dissolved in 75 grams of 29.5% aqueous ammonia. This solution was allowed to stand for 1 week in order to allow the insoluble solids to precipitate. The precipitate was filtered off. One cc. of this solution was then diluted in 100 cc. of distilled water and this solution was allowed to stand for several days. The solution was then filtered to separate the precipitate and was then ready for use.

EXAMPLE 7

The procedure followed was the same as that outlined in Example 6 excepting that ethyl alcohol was used in place of the distilled water in the final dilution.

EXAMPLE 8

The procedure of Example 6 was followed excepting that in place of the distilled water, a solution of ethyl alcohol and water in the ratio of 50:50 was used in the final dilution step.

EXAMPLE 9

This example is illustrative of a composition which is useful as an antibacterial lotion.

The following ingredients were mixed together in the proportions indicated:

|  | Grams |
|---|---|
| Gum tragacanth | 1 |
| Glycerine | 26.5 |
| Triethanolamine | 1 |
| Propylene glycol monostearate | 7.25 |
| Stearic acid (triple pressed) | 17.25 |
| Oleic acid | 3.25 |

To this was added 368 cc. of water containing enough of the 25% concentrate of Example 6 so that the final product contains .2% by weight of the reaction product (caprylic acid and silver oxide).

EXAMPLE 10

Twenty-five grams of the reaction product of caprylic acid and silver oxide prepared in accordance with the process of Example 2 was dissolved in 75 cc. of 29.5% aqueous ammonia. This product was stored for one week and then filtered. An additional 100 cc. of 29.5% aqueous ammonia was then added to the filtered solution to give a very stable product that served as a stock solution.

Although it is indicated above that 100 cc. of aqueous ammonia (29.5%) is added after the one week storage, this can vary. Thus, for example, the aqueous ammonia may be in the range of about 20% to 200% by weight based on the weight of the solution to which it is added.

Similarly, the storage time before filtering may vary considerably in this case. A stand time of from about 1 day to 1 month is suitable in the present invention.

The stock solution prepared by this example can be diluted with water to any desired extent. The solutions so diluted can be incorporated in any type of composition.

By way of illustration, the stock solution may be diluted with water to concentrations of ¼% of active material for incorporation in household spray compositions. These spray compositions may contain other constituents such as, for example, light stabilizers, propellants, etc. Ultraviolet light absorbers in the range of .01% to 5% (preferably ¼%) by weight of the total weight of the composition are suitable as light stabilizers. Of special interest is 2-hydroxy-4-methoxy-5-sulfobenzophenone in an amount of about ¼%.

A variety of propellants may also be employed in this spray composition to dispense the active material. Carbon dioxide gas under pressure has been found to be very suitable for this purpose.

The ingredients used in the various examples above, can be replaced by other ingredients depending on the use of which the composition is to be put. Thus, for example, alcohols such as methyl, isopropyl, butyl and other lower alkyl alcohol may be used in place of the ethyl alcohol set forth in some of the above examples. Also the composition of Example 9 may be varied depending on whether the composition is designed to be retained on the skin or absorbed thereby. When the former is the case, borax and wax emulsions may be added.

Whereas the invention has been described with reference to specific forms thereof, it will be understood that many changes and modifications may be made without departing from the spirit of this invention.

What is claimed is:

1. A method of preparing a stable antimicrobial composition, comprising the steps of reacting a metal oxide selected from the group consisting of silver oxides, gold oxides, mercury oxides and zinc oxides directly with a fatty acid having a carbon chain of substantially 5 to 30 carbon atoms to produce the corresponding metal salt of said fatty acid, disssolving said metal salt of said fatty acid in an approximately 5% to 29.5% aqueous-ammonia solution, and separating solids from said solution.

2. A method of preparing a stable antimicrobial composition, comprising the steps of reacting a silver oxide directly with a fatty acid having a carbon chain of substantially 5 to 18 carbon atoms in the absence of a solvent other than said fatty acid to produce the corresponding silver salt of said fatty acid, dissolving said silver salt of said fatty acid in an approximately 5% to 29.5% aqueous-ammonia solution, and separating solids from said solution.

3. A method of preparing a stable antimicrobial composition, comprising the steps of reacting a silver oxide directly with a fatty acid having a carbon chain of substantially 5 to 18 carbon atoms in the absence of a solvent other than said fatty acid to produce the corresponding silver salt of said fatty acid, dissolving said silver salt of said fatty acid in an approximately 5% to 29.5% aqueous-ammonia solution, permitting said solution to age for a period ranging between substantially one day and one month, and then separating solids from said solution.

4. A method of preparing a stable antimicrobial composition, comprising the steps of reacting a silver oxide directly with a fatty acid having a carbon chain of substantially 5 to 18 carbon atoms in the absence of a solvent other than said fatty acid to produce the corresponding silver salt of said fatty acid, dissolving said silver salt of said fatty acid in an approximately 5% to 29.5% aqueous-ammonia solution, permitting said solution to age for a period ranging between substantially one day and one month, then separating solids from said solution, diluting said aqueous-ammonia solution, and separating solids from the diluted solution.

5. A method of preparing a stable antimicrobial composition, comprising the steps of reacting a silver oxide directly with a fatty acid having a carbon chain of substantially 5 to 18 carbon atoms in the absence of a solvent other than said fatty acid to produce the corresponding silver salt of said fatty acid, dissolving said silver salt of said fatty acid in an approximately 5% to 29.5% aqueous-ammonia solution, permitting said solution to age for a period ranging between substantially one day and one month, then separating solids from said solution, diluting said aqueous-ammonia solution with water or a water-miscible alcohol, aging the diluted solution for an additional period of substantially one day to one month, and thereafter separating solids from the diluted solution.

6. The method defined in claim 5 wherein the diluted solution contains a water-miscible alcohol and said fatty acid is caprylic acid.

References Cited by the Examiner

Whitby: "Proceedings of Royal Society of Canada," vol. 13, (1919), p. 257.

CHARLES B. PARKER, *Primary Examiner.*